(No Model.)
C. E. DURYEA.
VELOCIPEDE.
No. 357,819. Patented Feb. 15, 1887.
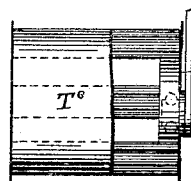
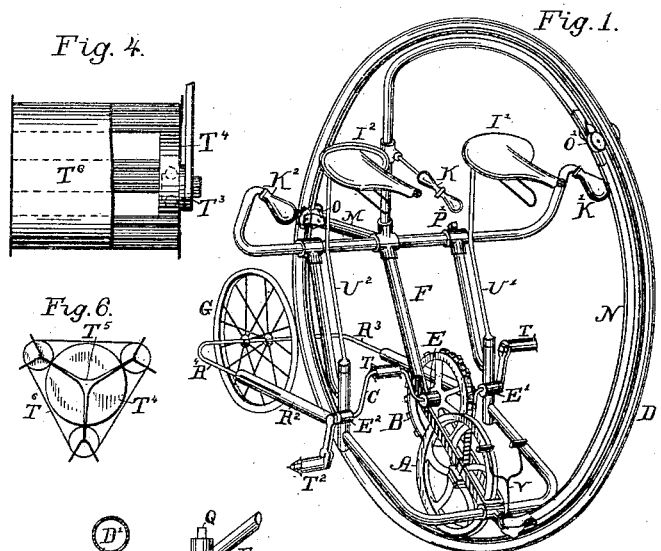
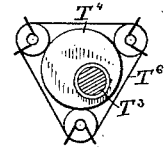
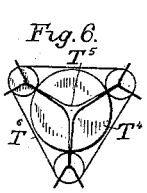
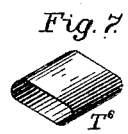
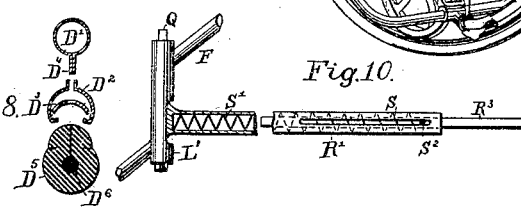
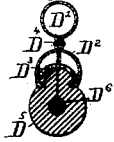
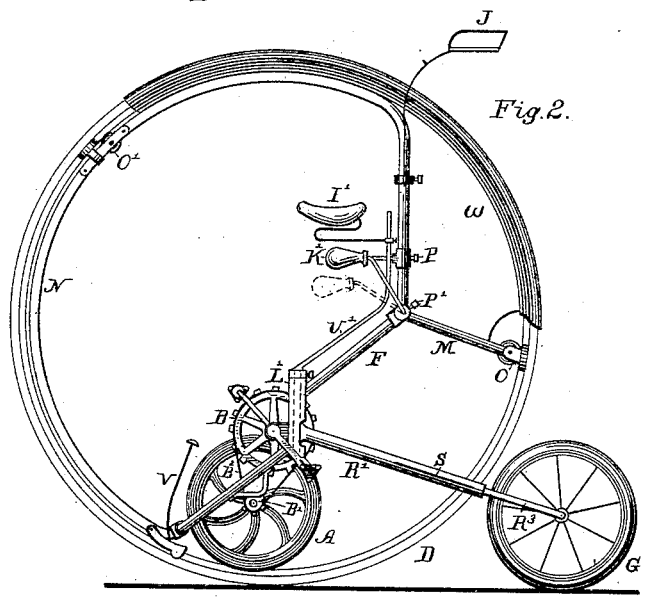
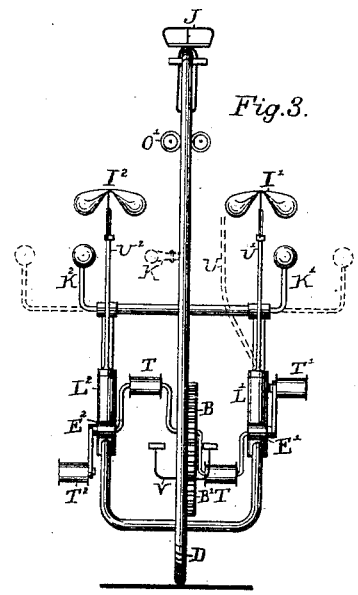
Witnesses
T. S. Fischer
L. Deane
Inventor
Charles E. Duryea

UNITED STATES PATENT OFFICE.

CHARLES E. DURYEA, OF WASHINGTON, DISTRICT OF COLUMBIA, ASSIGNOR OF ONE-HALF TO HARRY G. ROUSE, OF PEORIA, ILLINOIS.

VELOCIPEDE.

SPECIFICATION forming part of Letters Patent No. 357,819, dated February 15, 1887.

Application filed November 27, 1886. Serial No. 220,024. (No model.)

*To all whom it may concern:*

Be it known that I, CHARLES E. DURYEA, a citizen of the United States, formerly of Peoria, Illinois, but now residing at Washington, in the District of Columbia, have invented certain new and useful Improvements in Bicycles, of which the following is a specification.

My invention relates to improvements in that class of bicycles which have a small driving-wheel in order that the rider may be near to the ground; and the objects of my improvements are, first, to provide a bicycle suitable for two riders of either sex, and adjustable to any size; second, to provide a bicycle upon which the riders sit side by side in a convenient and comfortable position; third, to provide a bicycle for ladies' use which shall be safe and clean beyond any reasonable objection; fourth, to provide a bicycle which may be ridden by one person alone, while retaining the parts necessary to its use by two riders, or upon which a child may be carried; and, fifth, to reduce the vibration and loss of power accompanying the use of small wheels. The mechanism by which I accomplish these objects is shown in the annexed drawings, and is in some respects similar to that patented to me on January 5, 1886, No. 333,936.

Figure 1 is a perspective representing the general appearance of the machine. Fig. 2 is a side elevation. Fig. 3 is a front elevation. Figs. 4, 5, 6, and 7 are details showing the construction of the pedals. Figs. 8 and 9 are sections of the track and its tire, and Fig. 10 is a detail showing the construction of the reach.

Similar letters refer to similar parts.

A represents the driving-wheel; G, the rear or trailing wheel; $R'^3 R^{2\,4}$, the reaches connecting the rear wheel with the main frame; and F, the main frame, which is supported by bearings on the driving-wheel axle, and which carries the crank-shaft C in the bearings E' E², the steering-heads L' L², and the handles K' K². The frame F also carries the rearward projecting arm M and the curved brace N, attached at each end to each end of the said frame. Upon this arm and brace are respectively mounted the groups of rollers O O', each consisting of three rollers, and so arranged as to support the endless track D and cause it to be continually laid in front of the driving-wheel A.

The rear downward-projecting end of the brace N, above its junction with the frame F, forms a convenient support for the bar of the double handle K, which is so arranged that it may be raised, lowered, or swung laterally and fixed at any desired position. The bars of the single handles K' K² are telescopically attached to the frame F, and are also capable of lateral and vertical adjustment, as shown by the dotted lines in Figs. 2 and 3. Set-screws P P', or equivalent devices, are provided for fixing the bars at the desired position.

The steering heads and necks are each similar to the head and neck of an ordinary bicycle, and are placed in the same position relative to saddle and pedals that they are on the ordinary, other than that they are closer to the pedals, which arrangement permits of shorter reaches and allows greater room for the adjustment of the saddle. The necks are extended above the heads, as shown at Q in Fig. 10, and the saddle-posts U' U² are removably attached thereto in such a manner that they may be swung laterally and fixed where desired. By this arrangement the saddles and reaches move together just as in the ordinary bicycle. The steering-heads, however, being one each side of the steering-wheel, tend to move one forward and the other backward as the wheel is guided. To permit this both reaches are made telescopic, as shown in Fig. 10, in which L' is the steering-head; Q, the neck forming part of the reach; R', the large tubular part of the reach, having a slot, S, in one side thereof; R³, the small part of the reach, which telescopes or slides into the large part, and which at its rear end joins onto or forms the rear axle; and S² is a pin or stop fixed in R³, so as to move in the slot S. The slot S and stop S² are so placed in their respective parts that when the rear wheel, G, is in the plane of the track D and at the proper distance therefrom the stop will be at the rear end of the slot. To preserve this relation and thus keep the wheel G and the track D from interfering, an open coil-spring, S', is placed in the reach extending from the forward end of R' to the stop S², as shown in Fig. 10. In turning, the outer steering-head moves forward, carrying with it the trailing wheel, and the inner head moves backward, causing the inner reach to telescope and compress the coil-spring. Should the turn be very short, the stop S² will engage the forward end of the slot S of the inner reach and prevent the turn from being short enough to bring the track D against the outer reach. When the turn is effected, the action of the compressed spring and the drag of the rear wheel both tend to bring the wheels in line again and hold them there without effort on the part of the riders. This tendency improves the running of the machine by rendering it less susceptible to the alternating foot-thrusts. The power is applied to the crank-shaft C and then transmitted to the driving-wheel A by means of the sprocket-wheels B B' through the chain B².

The saddle-springs with saddles I' I² are adjustably attached to the saddle-posts U' U², as shown in Fig. 2, and also may be swung laterally upon them and fixed where desired.

To use the bicycle, two riders, having properly adjusted the handles and saddles, stand in front of the saddles, facing forward with hands on the handles. One holds the machine steady while the other mounts, after which the one places the proper foot upon the forward pedal and rises upon it. This starts the machine forward, bringing the empty saddle under the rider last mounting. In steering, the relative back and forward motion of the steering-heads is rendered unnoticeable by the forward motion of the machine; consequently the steering feels substantially the same in this as in the ordinary bicycle. The motion of the hands is just the same, and power applied to the handles from the saddle as a fulcrum turns the main frame, and with it the crank-shaft, driving-wheel, and track, just as it would turn the forks and front wheel of the ordinary machine.

A foot-brake, V, is provided, which may be applied by either or both riders. It is shown in Fig. 2 as pivoted to the brace N, near the forward end of the frame F, and is applied by pressing it against the track D with the feet. In case of a sudden dismount or a fall the track D and brace N are all that is in front of the riders to hinder them in alighting, and being narrow are but very little in the way.

A shield (not shown) is used to protect the clothes from being soiled or injured by the driving-wheel or sprocket-wheels and chain, and the upper part of the track is surrounded for the same purpose by a shield, W, Fig. 2.

The pedals are likewise covered by one or more broad bands of rubber, T⁶, Fig. 7, of proper size and width, stretched around them outside of the bars, as shown in Figs. 4, 5, and 6. These not only serve as a protection from the dirt and oil that gathers between the pedal-bars, but are valuable in that they afford a broad elastic surface for the foot. The pedals are further rendered more nearly clean by using bearing-boxes and shafts of such length and so placed that the pedal-bars extend outward beyond the outer end of the bearing-box, and thus effectually prevent the clothing from touching any oil that may be thereon.

In Fig. 4 the broad rubber band T⁶ is broken away from a pedal, showing a bearing of the single-row-ball variety placed at the inner end of the bars. This manner of placing the bearing-box at or near the inner end of the bars is in nowise objectionable, because the greater portion of the power is applied by the inner side of the foot, and therefore directly upon a bearing so placed.

It is also evident that whatever side strain there is will be resisted by the balls just as easily as a vertical strain, while if a plain bearing be used the box T⁴ and shaft T³ must each be much longer than shown in Fig. 4.

It is usually desirable to have the pedals closer to the saddle on hills and rough roads than on level smooth roads, and that this may be accomplished without dismounting from the bicycle I mount the pedals eccentrically upon their shafts, as shown in Fig. 5, in which T⁴ represents a pedal-bearing box, and T³ a shaft. This arrangement usually gives a sufficient amount of adjustment by turning a different side of the pedal upward.

The track D may be made flexible, but is preferably made stiff and circular and provided with a rubber tire, as shown. Owing to the weight bearing upon but one point of it at a time, it is needful that it possess considerable strength in the line of its plane, and having to bear more than the usual amount of weight a deeper rubber tire than usual is necessary. Therefore I prefer to use a track and tire of the shape shown in cross-section in Fig. 9. This track or rim is preferably made from four parts, D' D² D² D³, Fig. 8, each rolled from sheet metal and having substantially the shape shown. The parts D² D² are exactly alike, placed with their concave sides toward each other, and soldered or brazed to opposite edges of the part D³, thus forming the outer or larger portion of the rim and providing edges turned inward, so as to grip and hold the rubber tire. The inner part of the rim serves as a track for the driving-wheel, and is substantially of the shape shown at D', Fig. 8, but should conform to the shape of the felly of the driving-wheel. The driving-wheel felly is usually grooved or provided with flanges which keep it upon the track; but if not so provided the part D' should be grooved, so that the driving-wheel may follow it without danger of jumping from it. Other than these possible modifications it is formed, as shown, from one piece and having a web projecting outwardly. When the track is put together, this web bears against the part D³, and the whole is held by rivets, as shown in Fig. 9 at D⁴.

The tire D⁵ is U-shaped in cross-section, and when placed in the rim the mouth of the U is closed, leaving a hollow center, $D^6$. Being of this shape, the tire may be molded endless, while the hollow center saves weight and adds elasticity by allowing room for the rubber to compress.

When desirable to carry a child, a seat may be attached, as shown at J in Figs. 2 and 3.

For one rider only to use the machine one of the saddle-posts may be swung toward the plane of the wheels, as shown by the dotted lines at U, Fig. 3, the saddle and spring placed parallel with the said plane again, and the handle K swung in the same direction from the said plane. The rider may then mount, using the central pedals, T T, the handles K K', and the saddle I' on the post U' in its indicated position U, Fig. 3. In riding, the whole machine will lean from the rider sufficiently to bring the center of gravity over the line of the base. If desired, when used as a single, the outer pedals, T' T², the unused handle K², and the unused saddle I², with its post U², may be removed, thus lessening the weight considerably.

The use of telescopic handle-bars and detachable pedals permits the machine to be made very narrow for convenience in handling and storing.

If desired, the rollers in the groups O O' and the drive-wheel A may be provided with tires of rubber or other material for reducing noise, or the inner part, D', of the track may be covered with a similar material for the same purpose.

It is evident that the driving-wheel or the sprocket-wheels may be varied in size, as desired.

The driving-wheel A may be made as large as in an ordinary bicycle, and the track D, with the groups of rollers O O' and their supports, dispensed with. This, however, would be less convenient than the method shown, and would necessitate making the crank-shaft C in two equal parts and providing two sprocket-wheels and a chain upon each side of the driving-wheel.

As now made, the track D may be enlarged with but few changes in the remainder of the machine, and, being larger than a wheel could conveniently be made, it rolls over obstructions easier and with less jolting. Further, the track D, being large, has its center near to a line passing through the saddles, and they are less affected by the vibration of the rear wheel than if the center was more distant.

I claim and desire to secure by Letters Patent—

1. A bicycle for two riders, having a saddle on each side thereof, and in which the guiding and driving are effected by one and the same wheel.

2. A bicycle for two riders, having a saddle on each side of the wheel, which serves as both guiding and driving wheel.

3. A bicycle for two riders, having a saddle and a pair of pedals on each side of the forward wheel, and in which the guiding and driving are both effected by one and the same wheel.

4. In a bicycle, the wheels A G and the frame F, in combination with the reaches R'³ R²⁴, said reaches being pivoted to the said frame by means of the steering-heads L' L², so as to swing laterally.

5. In a bicycle, the wheels A G, the frame F, and the steering-heads L' L², in combination with the reaches R'³ R²⁴, said reaches connecting the rear wheel with the frame F, and arranged to telescopically shorten or lengthen one at a time as the bicycle is steered.

6. In a bicycle, the wheels A G, the frame F, and the steering-heads L' L², in combination with the reaches R'³ R²⁴, each consisting of two parts and an open coil-spring, the said parts being arranged to slide one within the other, one having a slot and the other a stop placed in the said slot for the purpose of limiting the telescopic action, and having the said spring so placed as to prevent the parts from telescoping accidentally.

7. In a bicycle, the wheels A G, the frame F, the steering-heads L' L², and the reaches R'³ R²⁴, in combination with the saddle-posts U' U², removably attached at their lower ends to the necks of the reaches and having at their upper ends the saddle-springs with saddles I' I² adjustably attached.

8. In a bicycle, the wheels A G, the frame F, the steering-heads L' L², and the reaches R'³ R²⁴, in combination with the crank-shaft C, provided with pedals for two riders, supported upon the frame F by the bearings E' E E², and connected with the driving-wheel by the sprocket-wheels and chain.

9. In a bicycle, the wheels A G, the frame F, the steering-heads L' L², and the reaches R'³ R²⁴, in combination with the arm M, the brace N, the group of rollers O O', arranged to support and guide the track D, and the track D.

10. In a bicycle, the wheels A G, the frame F, the steering-heads L' L², the reaches R'³ R²⁴, and the brace N, in combination with the brake V, so arranged as to rub against the inner face of the track D when pressed by the feet of the riders, and the handle K, with its bar so attached that it may be adjusted both vertically and laterally.

11. In a bicycle, the wheels A G, the frame F, the steering-heads L' L², and the reaches R'³ R²⁴, in combination with the handles K' K² and their bars, so attached to the frame F as to be both laterally and vertically adjustable.

12. In a bicycle, a pedal having only one bearing placed at or near the inner end, substantially as described.

13. A bicycle upon which two riders sit side by side, and which may be converted into a "single" by shifting one of the saddles and its respective pair of handles toward the center, substantially as described.

14. In a bicycle, a pedal mounted eccentrically upon its shaft, so that the distance between the saddle and pedal-face may be varied somewhat by turning a different face of the pedal upward.

15. In a bicycle, the four-part rim or track D, deep in the line of its plane, and formed substantially as described.

16. In combination with a bicycle for two riders, a child's seat, J, supported above and between the centers of the wheels A G, substantially as described.

CHARLES E. DURYEA.

Witnesses:
 WM. HELMICH,
 GEO. T. GIBBONS.